United States Patent
Shen et al.

(10) Patent No.: US 7,301,892 B2
(45) Date of Patent: Nov. 27, 2007

(54) WALSH MASK TEST IN CDMA CELLULAR WIRELESS COMMUNICATION SYSTEMS WITH PACKET DATA SERVICE

(75) Inventors: Oiang Shen, San Diego, CA (US);
Kraig Anderson, San Diego, CA (US);
Insung Kang, San Diego, CA (US)

(73) Assignee: VIA Telecom Co., Ltd., San Diego, CA (US)

( * ) Notice: Subject to any disclaimer, the term of this patent is extended or adjusted under 35 U.S.C. 154(b) by 221 days.

(21) Appl. No.: 11/142,771

(22) Filed: Jun. 1, 2005

(65) Prior Publication Data

US 2006/0274639 A1    Dec. 7, 2006

(51) Int. Cl.
*H04J 11/00* (2006.01)
(52) U.S. Cl. .................. 370/209; 370/335; 370/342
(58) Field of Classification Search .............. 455/73; 370/209, 335, 342, 203, 208
See application file for complete search history.

(56) References Cited

U.S. PATENT DOCUMENTS

| | | | |
|---|---|---|---|
| 5,771,288 A * | 6/1998 | Dent et al. | 380/270 |
| 6,504,832 B1 * | 1/2003 | Koo et al. | 370/342 |
| 6,839,336 B2 * | 1/2005 | Tiedemann et al. | 370/335 |
| 2004/0223473 A1 * | 11/2004 | Ha et al. | 370/335 |
| 2005/0002529 A1 | 1/2005 | Vannithamby | 380/255 |

OTHER PUBLICATIONS

"Medium Access Control (MAC) Standard for cdma2000 Spread Spectrum Systems", Release C, 3GPP2 C.S0003-C, Version 1.0, May 28, 2002, pp. 1-1 through 2-165.

* cited by examiner

*Primary Examiner*—Sanh D. Phu
(74) *Attorney, Agent, or Firm*—Christopher P. Maiorana, PC

(57) ABSTRACT

A mobile station comprising a decoder circuit and a control circuit. The decoder circuit may be configured to retrieve mask information from a packet data control channel. The control circuit may be configured to (i) determine whether the mask information is valid and (ii) when the mask information is valid, update a current mask of the mobile station with the mask information.

18 Claims, 4 Drawing Sheets

WALSH MASK TEST IN CDMA CELLULAR WIRELESS COMMUNICATION SYSTEMS WITH PACKET DATA SERVICE

FIELD OF THE INVENTION

The present invention relates to a method and/or architecture for wireless communication generally and, more particularly, to a Walsh mask test in code division multiple access (CDMA) cellular wireless communication systems with packet data service.

BACKGROUND OF THE INVENTION

Walsh codes are used to differentiate channels in a code division multiple access (CDMA) cellular wireless communication system. Some of the Walsh codes are allocated to dedicated channels, such as a fundamental channel (FCH) and a supplemental channel (SCH), or reserved for overhead channels. In a CDMA cellular wireless communication system that supports packet data services, such as those defined in Revision C (and above) of the IS-2000 standard, a subset of available Walsh codes is allocated for the transmission of data packets on a forward data packet channel (F-PDCH).

Usually one of several Walsh tables is selected through upper layer signaling, and Walsh codes are selected sequentially through the selected table using a Walsh mask. The Walsh mask is sent through a separate channel (i.e., a forward packet data control channel or F-PDCCH). The Walsh mask indicates the entries of the selected table to be skipped (masked) when selecting Walsh codes.

There is a certain probability for a mobile station to falsely decode a F-PDCCH frame and obtain a false Walsh mask. The probability can be as high as $1.5 \times 10^{-5}$. When a mobile station obtains a false Walsh mask, all subsequent decoding of the forward packet data channel (F-PDCH) will be wrong, until an update of the Walsh mask is sent by a base station and the mobile station correctly receives the updated Walsh mask.

It would be desirable to have a Walsh mask test in code division multiple access (CDMA) cellular wireless communication systems with packet data service.

SUMMARY OF THE INVENTION

The present invention concerns a mobile station comprising a decoder circuit and a control circuit. The decoder circuit may be configured to retrieve mask information from a packet data control channel. The control circuit may be configured to (i) determine whether the retrieved mask information is valid and (ii) when the mask information is valid, update a current mask of the mobile station with the retrieved mask information.

The objects, features and advantages of the present invention include providing a Walsh mask test in code division multiple access (CDMA) cellular wireless communication systems with packet data service that may (i) test a Walsh mask when updated before adopting, (ii) provide a method of testing a Walsh mask with other associated parameters for consistency, (iii) provide a method of testing a Walsh mask according to data decoding quality and/or (iv) provide a method of using a confidence index to decide whether to adopt a newly received Walsh mask.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
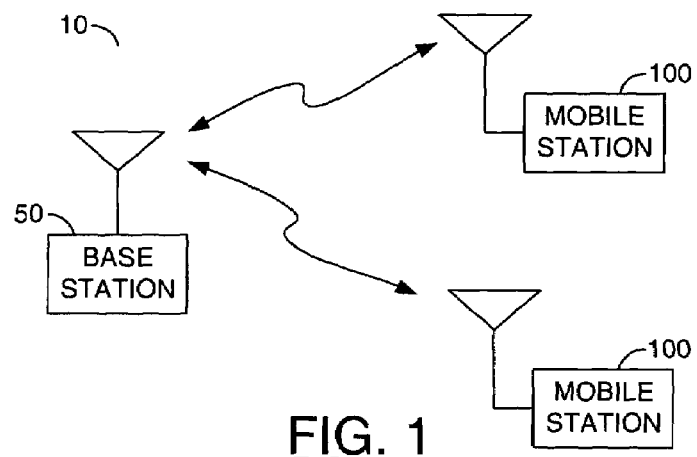
FIG. 1 is a block diagram illustrating a wireless communication system in accordance with one or more embodiments of the present invention.

Referring to FIG. 1, a block diagram is shown illustrating a wireless communication system 10 in which the present invention may be implemented. In one example, the wireless communication system 10 may comprise a base station 50 and a number of mobile stations 100. The mobile stations 100 may communicate with the base station 50, in one example, via a code division multiple access (CDMA) cellular communication protocol compliant with Revision C of the IS-2000 standard. However, the present invention may also be implemented in CDMA systems operating according to other standards (e.g., the Wideband CDMA (WCDMA) standard and the UMTS standard).

Each of the mobile stations 100 may be configured to receive a forward packet data channel (e.g., F-PDCH) carried by certain Walsh codes. In general, the particular Walsh codes used to carry the packet data channel may be selected from one of several tables based on a Walsh mask. The mobile stations 100 may be configured to receive the Walsh mask from the base station 50 via a forward packet data control channel (F-PDCCH). The forward packet data control channel (F-PDCCH) may be used to transmit information (e.g., packet data control message) from the base station 50 to the mobile stations 100 for use in decoding data transmissions on the F-PDCH. The Messages on the F-PDCCH may be transmitted concurrently with packet data transmissions on the F-PDCH. The packet data control message generally identifies the mobile station to receive the concurrent packet data transmission on the F-PDCH. The packet data control message may be used to send a Walsh mask. The Walsh mask indicates to the mobile stations 100 the Walsh code set available to the F-PDCH.

According to IS-2000 standard there may be two packet data control channels (PDCCHs), PDCCH0 and PDCCH1. The content of the PDCCH0 with MAC_ID=0 is interpreted as a Walsh mask and is applied to the decoding of subsequent frames of the PDCH. When the F-PDCCH0 message contains a MAC_ID equal to '00000000', the F-PDCCH0 message contains a Walsh space mask bitmap rather than a packet data channel assignment for a specific mobile station. The remaining bits in the message comprise a bitmap (e.g., Walsh space mask bitmap) corresponding to specific Walsh indices that are to be omitted from the Walsh space that is used to decode the F-PDCH transmission. All mobile stations that receive the message save the bitmap, and apply it to subsequent F-PDCCH assignments including any assignment on F-PDCCH1 during the same time interval. The mask is used by the base station to exclude portions of the Walsh code space (e.g., when the Walsh codes are in use for F-FCHs, F-DCCHs or F-SCHs assigned to certain mobile stations). Mobile stations incorporating the present invention generally determine the validity of the received bitmap before adopting the bitmap as the current Walsh mask.

The base station 50 may be configured to transmit voice and packet data to the mobile stations 100 over one or more dedicated traffic channels (e.g., a Forward Fundamental Channel (F-FCH) and a Forward Supplemental Channel (F-SCH)). The F-FCH is generally used primarily for voice communications, while the F-SCH is generally used primarily for real-time packet data transmissions. The base station 50 may also transmit packet data to the mobile stations 100 over the shared forward packet data channel (F-PDCH). Use of the F-PDCH for packet data transmissions is preferred for bursty, delay tolerant packet data. The base station 50 may be configured to transmit packet data to only one mobile station 100 at a time on the F-PDCH using all available power and Walsh codes or divide the F-PDCH into two or more subchannels, in which case the base station 50 may transmit to one mobile station 100 on each subchannel. When the base station 50 divides the F-PDCH into subchannels, the available resources (e.g., Walsh codes and power) are divided between the subchannels of the F-PDCH. The base station 50 may be implemented using conventional techniques to meet the specifications of the particular standard or standards supported.

The structure and content of a F-PDCCH frame in IS-2000, Rev C is well-known in the art. A description can be found in the standards document Medium Access Control (MAC) Standard for IS-2000 Spread Spectrum Systems, Release C, 3GPP2 C.S0003-C, Ver. 1.0, May 28, 2002, which is hereby incorporated by reference in its entirety. Control messages are typically sent with each frame. In one example, a F-PDCCH control message (e.g., illustrated in TABLE 1 below) may comprise a number of fields containing parameters used by the mobile station for the F-PDCH. In one example, each field may be implemented having a number of bits as illustrated in the following TABLE 1.

TABLE 1

| MAC_ID | EP_SIZE | ACID | SPID | AI_SN | LWCI | EXT_MSG _TYPE | RESERVED |
|---|---|---|---|---|---|---|---|
| 8 | 3 | 2 | 2 | 1 | 5 | 2 | 8 |

The control message generally includes a mobile station identifier referred to as the MAC identifier (e.g., MAC_ID). The base station 50 is generally configured to set the MAC identifier field to the MAC-ID of the mobile station 100 that is scheduled to receive the F-PDCH. The control message further comprises an encoder packet size field (e.g., EP_SIZE), a ARQ channel identifier field (e.g., ACID), a subpacket identifier field (e.g., SPID), an ARQ identifier sequence number (e.g., AI_SN), a Last Walsh Code Index field (e.g., LWCI), an extended message type identifier (e.g., EXT_MSG_TYPE) and a reserved field. In Rev C of the IS-2000 standard, the LWCI information element is used to designate a set of consecutively numbered Walsh codes used by the F-PDCH. For example, when the Walsh code set for the F-PDCH begins with Walsh code index=0, the Walsh code set for the F-PDCH would be Walsh codes 0-LWCI.

A Walsh code assignment message (e.g., illustrated in TABLE 2 below) comprises an 8-bit MAC_ID field, similar to the control message, and a WALSH_MASK field for broadcasting the Walsh code assignment for the F-PDCH. The Walsh code assignment generally changes at a rate much slower than the frame rate, so the Walsh code assignment message does not need to be sent every frame. For example, the Walsh code assignment message may be sent, on average, once per minute.

TABLE 2

| MAC_ID | WALSH_MASK |
|---|---|
| 8 | 13 |

As noted above, the Walsh codes allocated to the F-PDCH may change over time. The Walsh mask is sent to the mobile stations 100 in a Walsh code assignment message (TABLE 2) on the F-PDCCH to indicate what Walsh codes are available to the F-PDCH. For the Walsh code assignment message, the MAC_ID is set to '00000000.' The Walsh mask generally indicates which Walsh codes are unavailable for use by the F-PDCH. For example, the corresponding Walsh codes may have been assigned to forward dedicated channels, such as the FCH and SCH.

Figure 2:
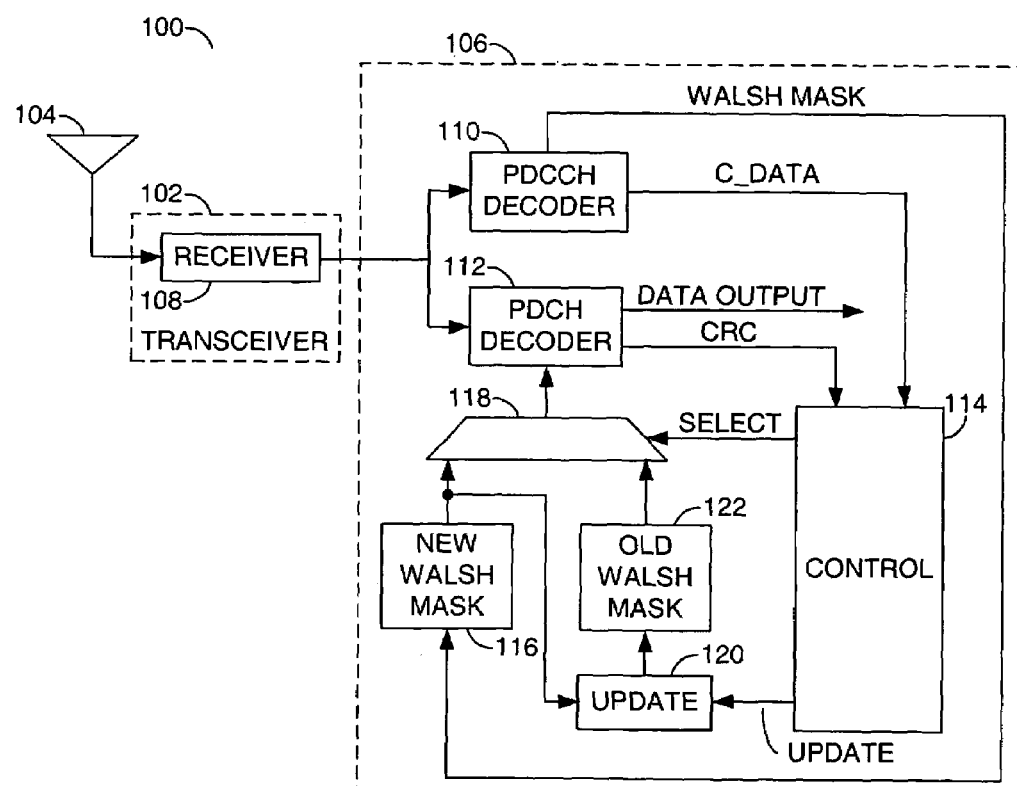
FIG. 2 is a more detailed block diagram of a mobile station of FIG. 1.

Referring to FIG. 2, a more detailed block diagram of a mobile station 100 is shown. As used herein, the term "mobile station" may refer to any of: (i) a cellular radiotelephone, (ii) a Personal Communications System (PCS) terminal that may combine a cellular radiotelephone with data processing, facsimile, and data communications capabilities, (iii) a Personal Data Assistant (PDA) that may include a pager, Web browser, radiotelephone, Internet/intranet access, organizer, calendar, and a conventional laptop and/or palmtop receiver or (iv) any other devices that may include a radiotelephone transceiver.

The mobile station 100 may comprise a transceiver 102 connected to an antenna 104. The mobile station 100 may further comprise a system controller 106. The transceiver 102 generally comprises a receiver 108 and a transmitter (not shown for clarity). The transceiver 102 may, for example, operate according to the IS-2000, WCDMA or UMTS standards. However, the present invention is not limited to use with these standards and those skilled in the art will recognize the present invention may be extended or modified for other standards. The transceiver 102 may be implemented using conventional techniques.

The system controller 106 generally provides overall operational control for the mobile station 100. In one example, the system controller 106 may control operations of the mobile station 100 according to programs and/or instructions stored in memory. The system controller 106 may be implemented using a microprocessor or microcontroller. The system controller 106 may be part of an application specific integrated circuit (ASIC) or application specific standard product (ASSP). The system controller 106 may comprise memory (not shown) to provide storage for data, operating system programs and application programs. Memory may be integrated with the system controller 106, or may be implemented in one or more discrete memory devices.

In one example, the system controller 106 may comprise a circuit (or block) 110, a circuit (or block) 112, a circuit (or block) 114, a circuit (or block) 116, a circuit (or block) 118, a circuit (or block) 120 and a circuit (or block) 122. The circuit 110 may be implemented, in one example, as a packet data control channel (PDCCH) decoder. The circuit 112 may be implemented, in one example, as a packet data channel (PDCH) decoder. The circuit 114 may be implemented, in one example, as a control block. The circuit 116 may be implemented, in one example, as a new Walsh mask storage block. The circuit 118 may be implemented, in one example, as a multiplexer circuit. The circuit 120 may be implemented, in one example, as an update circuit. The circuit 122 may be implemented, in one example, as an old Walsh mask storage circuit. The functional elements of FIG. 2 may be implemented in software (or firmware), hardware, or some combination of thereof. For example, one or more of the functional elements in the mobile station 100 may be implemented as stored program instructions executed by one or more microprocessors or other logic circuits included in the mobile station 100.

An output of the receiver 108 may present a signal to an input of the circuit 110 and an input of the circuit 112. The circuit 110 may have, in one example, a first output that may present control data (e.g., C_DATA) to a first input of the circuit 114 and a second output that may present a received Walsh mask (e.g., WALSH MASK) to an input of the circuit 116. The circuit 112 may have a first output that may present a cyclic redundancy check (CRC) signal to a second input of the circuit 114 and a second output that may present a decoded data output (e.g., DATA OUTPUT).

The circuit 114 may have a first output that may present a control signal (e.g., SELECT) to a control input of the circuit 118 and a second output that may present a control signal (e.g., UPDATE) to an input of the circuit 120. The circuit 116 may have an output that may present a signal to (i) a first input of the circuit 118 and (ii) an input of the circuit 120. The circuit 120 may have an output that may present a signal to an input of the circuit 122. The circuit 122 may have an output that may present a signal to a second input of the circuit 118.

Figure 3:
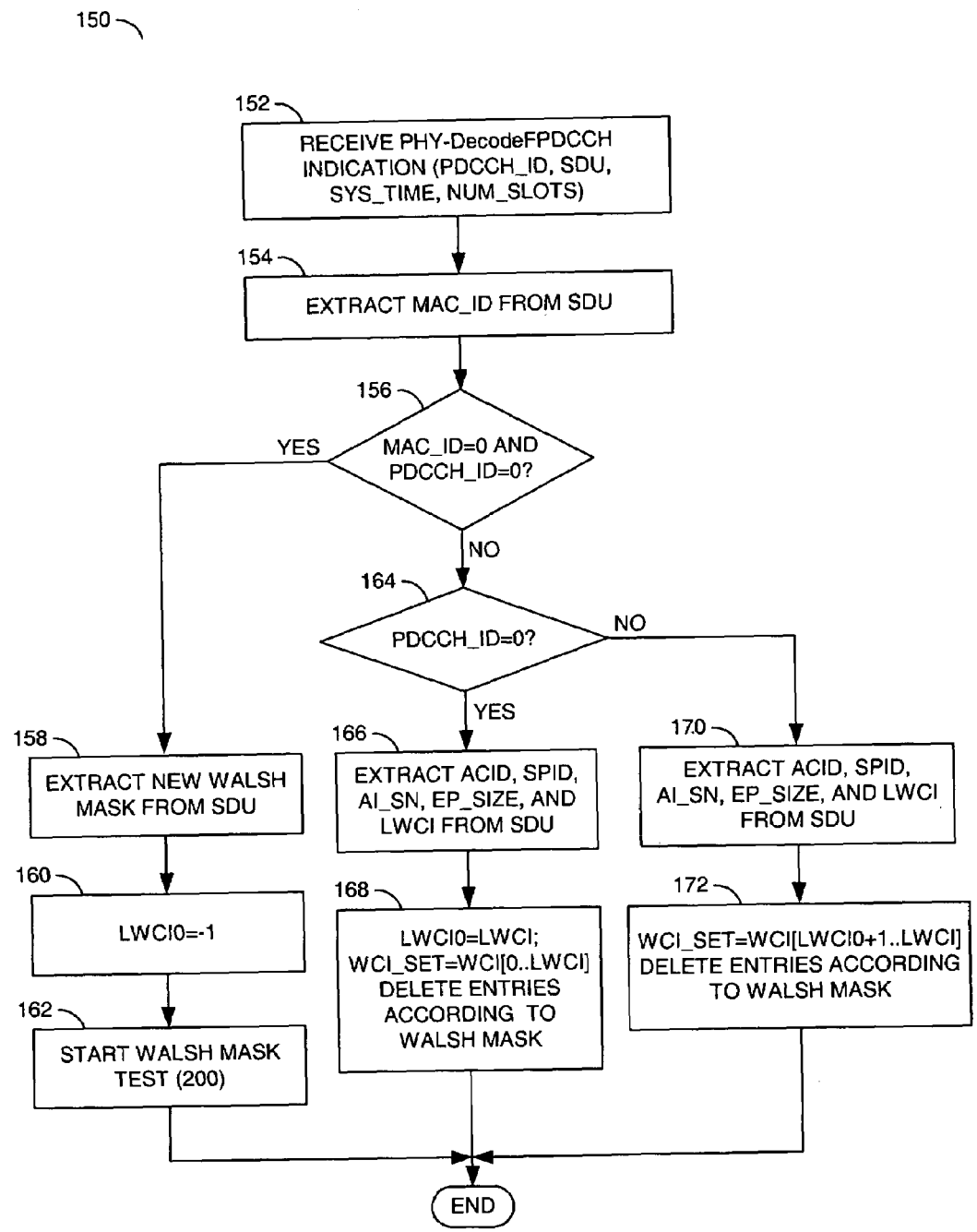
FIG. 3 is a flow diagram illustrating a portion of a packet data control channel function operation in accordance with one or more embodiments of the present invention.

Referring to FIG. 3, a flow diagram 150 is shown illustrating a portion of a forward packet data control function in accordance with one or more embodiments of the present invention. The process 150 generally begins with an indication that a control packet (service data unit or SDU) has been received for decoding (e.g., block 152). The MAC_ID is extracted from the service data unit (e.g., block 154). The MAC_ID and a packet data control channel ID are checked for a value equal to 0 (e.g., block 156). When both the MAC_ID and the PDCCH_ID are 0, the process 150 begins an update operation for the Walsh mask. A new Walsh mask is extracted from the service data unit (e.g., block 158). The new Walsh mask is examined (or tested) to determine whether (i) the new Walsh mask is valid and should be adopted or (ii) the new Walsh mask is invalid and the old Walsh mask should be maintained (e.g., blocks 160 and 162).

Once the Walsh mask test starts (e.g., block 162), the portion of the forward packet data channel control function (PDCHCF) receiver operation represented by the flow diagram 150 ends. However, the test process generally lasts longer. For example, the test process may continue as new PDCCH SDUs are received (described in more detail in connection with FIGS. 4 and 5).

When the MAC_ID is not equal to 0, the PDCCH_ID is checked for a value equal to 0 (e.g., block 164). When the PDCCH_ID is 0, the process 150 continues by extracting a number of fields (e.g., EP_SIZE, ACID, SPID, AI_SN and LWCI) from the SDU (e.g., block 166). A variable LWCI0 is set to the value contained in the extracted field LWCI. A variable WCI_SET is updated based on the LWCI value extracted from the SDU and Walsh codes are deleted from the selected table based on the Walsh mask (e.g., block 168).

When the PDCCH_ID is not equal to 0, the process 150 continues by extracting the number of fields (e.g., EP_SIZE, ACID, SPID, AI_SN and LWCI) from the service data unit (e.g., block 170). The variable WCI_SET is set to WCI [LWCI0+1 . . . LWCI] based on the value LWCI received from the SDU and entries in the selected Walsh table are deleted according to the Walsh mask (e.g., block 172). In general, the blocks 152, 154, 156, 164, 166, 168, 170 and 172 may be implemented according to conventional techniques.

Figure 4:
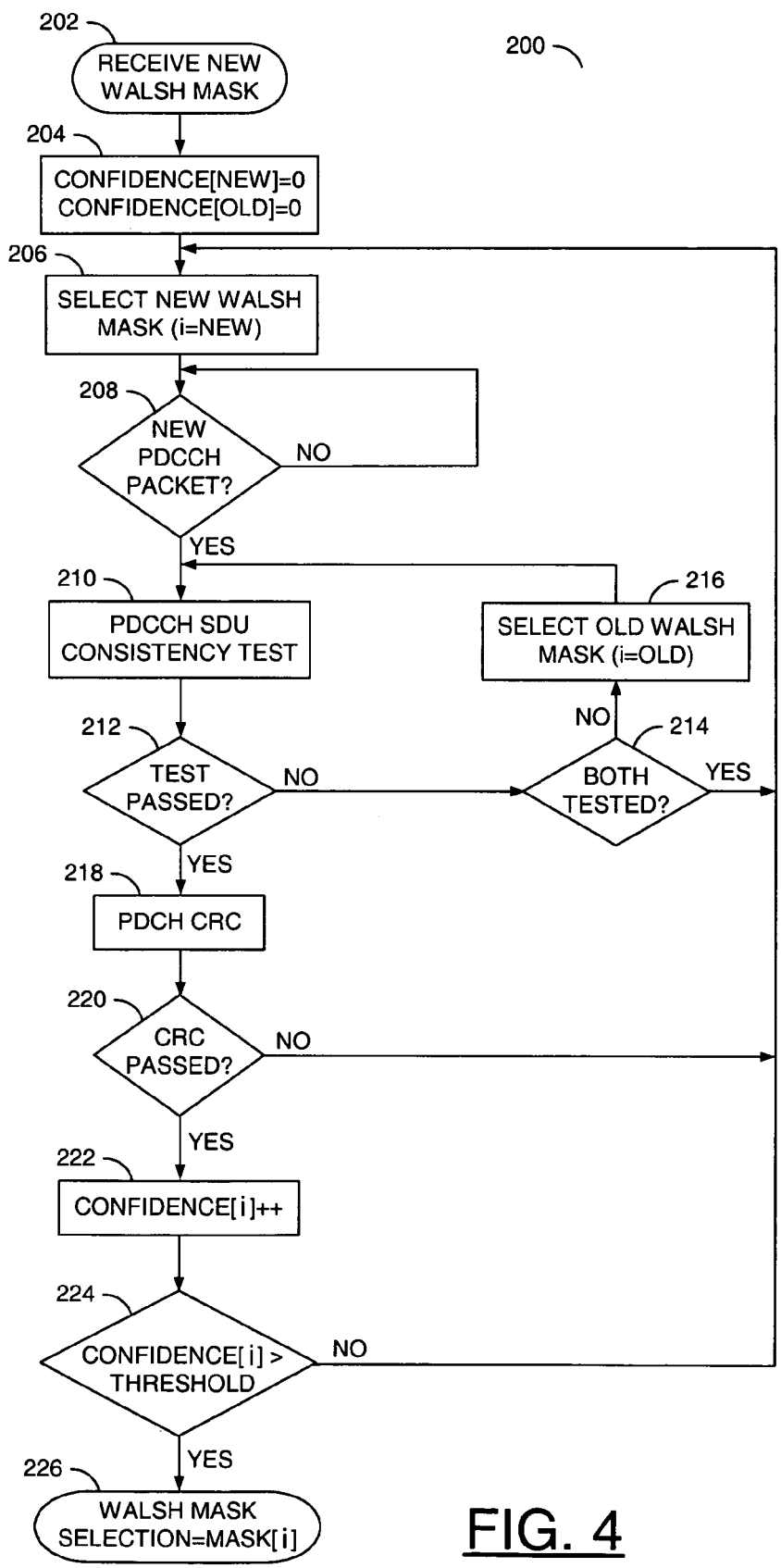
FIG. 4 is a more detailed flow diagram illustrating an example mask test process in accordance with a preferred embodiment of the present invention.

Referring to FIG. 4, a flow diagram 200 is shown illustrating a Walsh mask test process in accordance with a preferred embodiment of the present invention. The process 200 is generally implemented to determine which Walsh mask to select during the Walsh mask update operation that is started in block 162 in FIG. 2. In one example, the process 200 may begin with the reception of a new Walsh mask (e.g., block 202). In one example, a variable (e.g., CONFIDENCE (i)) may be initialized in preparation for determining whether to use the new mask in place of an old mask (e.g., block 204). The new Walsh mask may be selected (e.g., block 206) and a determination made whether a new packet data control channel (PDCCH) packet has been received (e.g., block 208). When a new packet data control channel packet has not been received, the process 200 may enter an idle state waiting for a new control packet (e.g., the NO arrow exiting from the block 208).

When a new control packet (or SDU) is received, the process 200 may proceed by testing the consistency of the control packet with the selected Walsh mask (e.g., blocks 210 and 212). When the consistency test fails (e.g., the NO Path from the block 212), the process 200 may determine whether both the new and old Walsh masks have been tested (e.g., block 214). When both masks have been tested, the process 200 generally returns to the block 206 to select the new Walsh mask again and wait for a new PDCCH SDU. When both masks have not been tested, the process 200 generally selects the old Walsh mask (e.g., block 216) and again checks the consistency (e.g., blocks 210 and 212).

The consistency test (e.g., block 210) may comprise counting the number of Walsh codes allocated for the corresponding PDCH, and checking whether the count and other parameters (e.g., encoder packet size, number of slots, etc.) correspond to a valid transmission pattern (case) predefined by the standard. When the PDCCH data is valid, the consistency test is passed. When the packet passes the consistency test, the process 200 generally continues by performing a data integrity check (e.g., a cyclic redundancy check (CRC) test) of the packet data channel (e.g., blocks 218 and 220). For example, the packet data channel (PDCH) data may be decoded and a CRC test may be performed on the decoded data. When the decoded data does not pass the CRC test, the process 200 returns to the block 206 (e.g., the NO path from the block 220), selects the new Walsh mask again, and waits for a new PDCCH packet. When the decoded data passes the CRC test, the process 200 generally continues by incrementing the confidence variable for the selected Walsh mask (e.g., block 222).

When the confidence variable has been incremented, the process 200 generally continues by checking the confidence variable to see whether the confidence variable has exceeded a predetermined threshold value (e.g., block 224). When the confidence variable has not exceeded the predetermined threshold, the process 200 generally returns to the block 206 (e.g., the NO path from the block 224). When the value of the confidence variable exceeds the predetermined threshold, the process 200 sets the selected Walsh mask to the mask associated with the respective confidence variable that exceeded the predetermined threshold (e.g., block 226) and the test is considered completed.

The present invention provides a test for Walsh mask update. When a mobile station receives a PDCCH with MAC_ID=0, the mobile station does not apply the content as a new Walsh mask immediately. Instead, the mobile station runs through a test according to the flow chart of FIG. 4. The test may last for more than one frame. Before a decision is made, both the new and old Walsh masks are considered as a potentially correct Walsh mask.

The present invention may reduce the probability of selecting a wrong Walsh mask. For example, when the PDCCH uses two 8-bit CRCs and the PDCH uses a 16-bit CRC, as defined in IS2000, the false alarm probability p of selecting a wrong Walsh mask may be expressed by the following equation:

$$p=P(pdcch\_false\_macid=0)*P(pdcch false test)*P(pdch\_false\_crc)$$

$$<P(pdcch\_false\_macid=0)*P(pdch\_false\_crc)=2^{-16} \cdot 2^{-16(TR+1)},$$

where P(pdcch_false_macid=0) represents the probability of falsely detecting a F-PDCCH0 message contains a MAC_ID=0, P(pdcchfalsetest) represents the probability that the PDCCH SDU test will be falsely passed, P(pdch_false_crc) represents the probability that the PDCH CRC test will be falsely passed, and TR represents the confidence threshold. Based upon the above equation, the probability of selecting a wrong Walsh mask may be reduced (or minimized) by selecting the confidence threshold TR as greater than or equal to zero. When TR=0, a single CRC pass will pass the entire Walsh mask test. The error rate p is generally already acceptable in most cases when TR=0. Thus, TR=0 is generally suggested as a default value.

Figure 5:
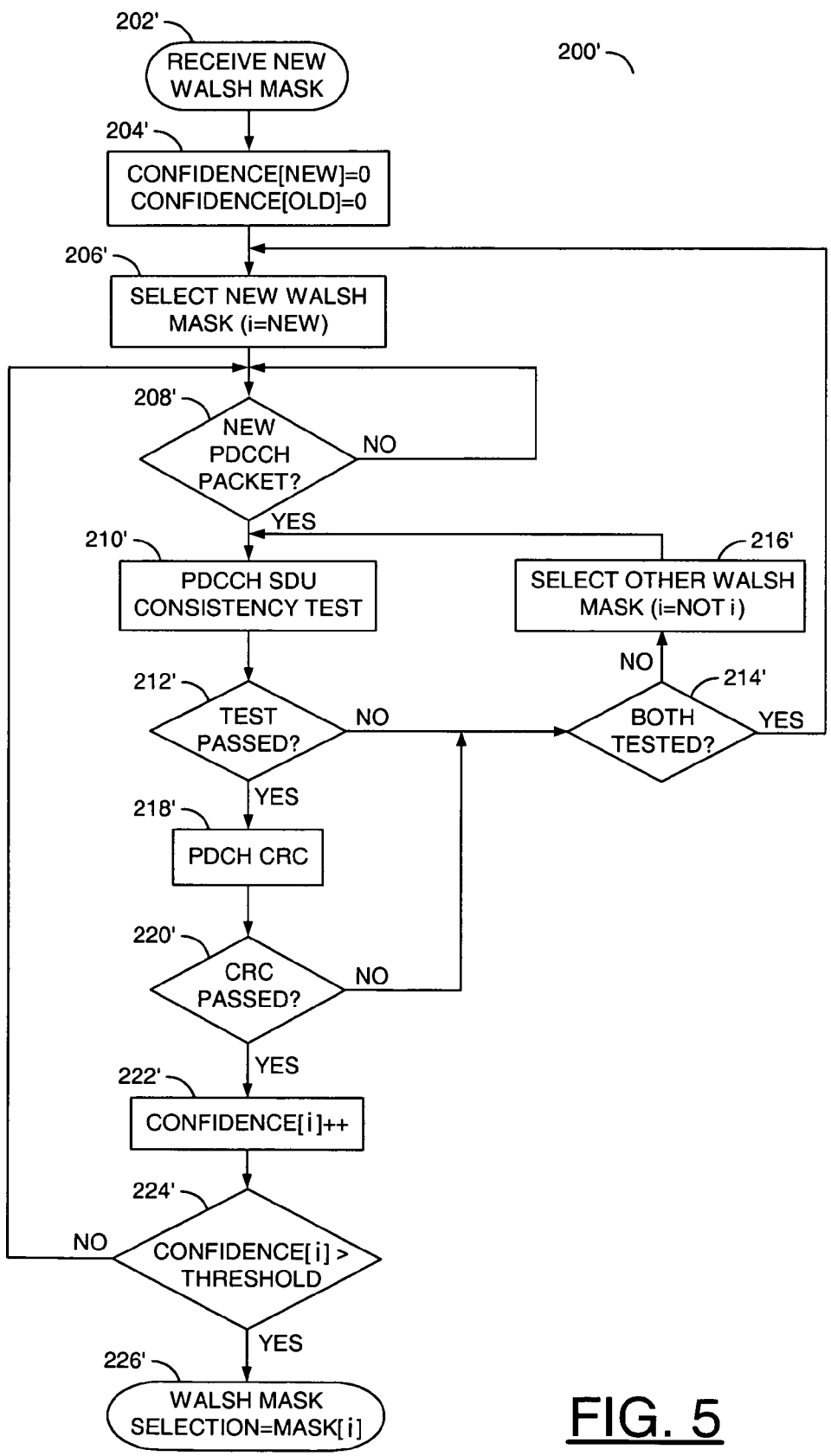
FIG. 5 is a more detailed flow diagram illustrating an example mask test process in accordance with another preferred embodiment of the present invention.

Referring to FIG. 5, a flow diagram 200' is shown illustrating an alternative embodiment of the present invention. Except as described below, the process 200' may be implemented similarly to the process 200. In one variation, when the PDCH CRC fails (e.g., the NO path from block 220'), the process 200' moves to the block 214'. In another variation, when the confidence variable does not exceed the confidence threshold (e.g., the NO path from the block 224'), the process 200' moves to the block 208'. By moving to the block 208', the process 200' first uses the Walsh mask that passed the CRC test as the selected Walsh mask for the next PDCCH packet. The selected Walsh mask that passed the CRC test may be either the new Walsh mask or the old Walsh mask. Because the selected Walsh mask may be either the new Walsh mask or the old Walsh mask, the process 200' handles a failure of either the consistency test or the CRC test differently from the process 200. In the process 200', the block 216' is generally configured to select the unselected mask (e.g., toggle the value i). For example, when the selected Walsh mask is the new Walsh mask, the block 216' generally selects the old Walsh mask in response to failure of either the consistency test or the CRC test. However, when the selected Walsh mask is the old Walsh mask, the block 216' generally selects the new Walsh mask in response to a failure of either the consistency test or the CRC test. When the process 200' is implemented, the mobile station hardware is generally configured to have enough throughput to process two frames of PDCH data within one PDCH decoding period.

While the invention has been particularly shown and described with reference to the preferred embodiments thereof, it will be understood by those skilled in the art that various changes in form and details may be made without departing from the spirit and scope of the invention.

The invention claimed is:

1. A mobile station comprising:
   a decoder circuit configured to retrieve mask information from a packet data control channel; and
   a control circuit configured to (i) determine whether said mask information is valid and (ii) when said mask information is valid, update a current mask of said mobile station with said mask information, wherein said current mask is updated with said mask information when a predetermined confidence threshold is exceeded by a confidence variable generated in said mobile station for determining whether to update said current mask with said mask information.

2. The mobile station according to claim 1, wherein said apparatus comprises a device selected from the group consisting of (i) a cellular radiotelephone, (ii) a Personal Communications System (PCS) terminal, (iii) a Personal Data Assistant (PDA) that may include a pager, Web browser, radiotelephone, Internet/intranet access, organizer, calendar, and a conventional laptop and/or palmtop receiver and (iv) any other device including a radiotelephone transceiver.

3. The mobile station according to claim 2, wherein said Personal Communications System (PCS) terminal combines a cellular radiotelephone with one or more capabilities selected from the group consisting of data processing, facsimile, and data communications.

4. The mobile station according to claim 2, wherein said Personal Data Assistant (PDA) comprises one or more devices selected from the group consisting of a pager, a Web browser, a radiotelephone, an Internet/intranet access, an organizer, a calendar, a conventional laptop receiver and a palmtop receiver.

5. The mobile station according to claim 1, wherein said mask information comprises a Walsh space mask bitmap.

6. The mobile station according to claim 1, wherein said decoder circuit is configured to decode a forward packet data channel (F-PDCH).

7. The mobile station according to claim 6, wherein said validity of said mask information is determined based on a cyclic redundancy check of data decoded from said F-PDCH.

8. The mobile station according to claim 1, wherein said control circuit is further configured to determine a consistency of a packet data control channel (PDCCH) service data unit (SDU).

9. An apparatus comprising:
   means for retrieving mask information from a packet data control channel;

means for determining a validity of said mask information; and means for updating a current mask of said apparatus with said mask information when said mask information is valid, wherein said current mask is updated with said mask information when a predetermined confidence threshold is exceeded by a confidence variable generated in mobile station for determining whether to update said current mask with said mask information.

10. A method for updating a Walsh mask in a mobile station of a code division multiple access (CDMA) cellular communication system comprising the steps of:

retrieving mask information from a packet data control channel;

determining whether said mask information is valid; and updating a current Walsh mask of said mobile station with said mask information when said mask information is valid, wherein said current mask is updated with said mask information when a predetermined confidence threshold is exceeded by a confidence variable generated in said mobile station for determining whether to update said current mask with said mask information.

11. The method according to claim 10, wherein said mask information comprises a Walsh space mask bitmap.

12. The method according to claim 10, further comprising:

decoding a forward packet data channel (F-PDCH).

13. The method according to claim 12, wherein said validity of said mask information is determined based on a cyclic redundancy check (CRC) of data decoded from said F-PDCH.

14. The method according to claim 10, further comprising:

determining validity of said mask information based on a consistency of a packet data control channel (PDCCH) service data unit (SDU).

15. The method according to claim 10, further comprising:

configuring a transceiver circuit to operate in a mobile station of an IS2000 compliant code division multiple access (CDMA) cellular wireless communication system.

16. The method according to claim 13, further comprising:

incrementing a confidence value associated with a mask under test in response to a valid CRC.

17. The method according to claim 16, further comprising:

determining whether said confidence value exceeds a predetermined confidence threshold.

18. The method according to claim 17, wherein said predetermine confidence threshold is greater than or equal to zero.

* * * * *

UNITED STATES PATENT AND TRADEMARK OFFICE
CERTIFICATE OF CORRECTION

PATENT NO. : 7,301,892 B2 Page 1 of 1
APPLICATION NO. : 11/142771
DATED : November 27, 2007
INVENTOR(S) : Qiang Shen et al.

It is certified that error appears in the above-identified patent and that said Letters Patent is hereby corrected as shown below:

Title page, item (75) Inventors: replace "Oiang Shen" with "Qiang Shen"

Signed and Sealed this

Twentieth Day of January, 2009

JON W. DUDAS
*Director of the United States Patent and Trademark Office*